UNITED STATES PATENT OFFICE.

E. C. FROST, OF HIGHLAND NURSERIES, NEW YORK.

IMPROVED COOKED VEGETABLE FOOD.

Specification forming part of Letters Patent No. 38,039, dated March 31, 1863.

*To all whom it may concern:*

Be it known that I, E. C. FROST, of Highland Nurseries, in the county of Schuyler and State of New York, have invented a new and useful Improvement in Condensed *Solanum Tubersum* in a Cooked State; and I do hereby declare that the following is a full and exact description thereof.

The design of my improvement is to reduce into a more concentrated form the vegetable known as "*Solanum tuberosum*" or common potato, so that it may not only be more easily and compactly transported, but also be preserved against decay and retain its fine flavor and nutritive qualities in all conditions of climate and under all circumstances to which it may be exposed.

In preparing the material, I cook the tubers by boiling, steaming, or in some analogous manner, then remove the skins, and, while hot or warm, pulverize finely by mashing, grating, or grinding, so that no hard lumps shall remain. In this state salt, pepper, or other seasoning is preferably applied, though this is not absolutely necessary, as, when fully prepared the material will be preserved without them. I then spread the pulp in thin sheets, so as to be well exposed to the air, and before it has time to ferment or sour dry it by artificial or other heat to a hard brittle mass, so that the watery matter is thoroughly evaporated. When this is accomplished I crush or grind the material by passing it through a grinding mill or otherwise to any degree of fineness required; and, if desirable, it may also be sifted or bolted, so as to produce a very fine flour.

Thus prepared I preserve all the solid and nutritive elements of the tuber, while the watery matter is evaporated, leaving the mass in a perfectly dry and pulverulent state, so that it cannot decay, ferment, or become otherwise affected more than cornmeal or any other similar edible substance, and it is therefore adapted to be exposed to all climates or circumstances, such not being the case with the unprepared potato, which soon decays or loses its fine flavor and nutritive qualities. By this process of preparation I also greatly condense or concentrate the substance, a bushel of tubers furnishing only about four to six quarts of the prepared *Solanum*, thus placing the material in the most compact form for transportation, while all the solid matter is retained. For these reasons it is particularly adapted to army use, and would furnish an article of food greatly needed, and which, if employed, would save many lives each year. For the same reasons, also, it is well adapted to navy use and sea voyages, where the tubers cannot be taken. In this relation it forms an excellent element to mix with meal for bread. For ordinary domestic use it is almost indispensible when once introduced.

The adaptations of the substance thus produced are various. For soup, add cold water, allowing it to stand a little time to absorb and expand. Then scald, and, if not seasoned in the preparatory process, add pepper, salt, and, if desirable or convenient, butter, or other substances to suit the taste. For ordinary table use, add as much water as it will absorb, heat, and season, and it will be similar to ordinary mashed potato. Various other methods may be employed. Being cooked in the preparatory process, the material merely requires scalding or slightly heating, the long process of ordinary cooking being thus avoided, a matter of the greatest consequence, especially for army use, or where it is not convenient to cook. Indeed heat may be entirely dispensed with in this relation, and it still retains its palatable qualities. In this respect it is a good substitute, partially or wholly, for bread, or other food, where the same cannot be easily cooked or obtained—as, for instance, in the march of an army, where transportation is difficult. In this concentrated state it is equally adapted for forage, where the difficulties of transportation will not admit of the ordinary food for horses.

I am aware that the starch of various substances has been prepared as food. In the preparation of the potato I do not separate the starch from the other solid elements, but condense all the solid parts together, thus retaining all the desirable qualities, and preserving at the same time the true taste of the tuber. Neither do I mix the *Solanum* with the other substance—such as cornmeal, for instance—to produce an article of commerce; but I limit myself to the simple unadulterated, concentrated, cooked substance, as herein described; nor do I claim pressing potatoes through a perforated cylinder, as heretofore practiced.

What I claim as my invention, and desire to secure by Letters Patent as a new article of manufacture and commerce, is—

The condensed product of the *Solanum tuberosum* in a cooked state for food, prepared substantially in manner and for the purpose herein set forth.

In witness whereof I have hereunto signed my name in the presence of two subscribing witnesses.

E. C. FROST.

Witnesses:
W. A. LODER,
R. F. OSGOOD.